United States Patent [19]

Pollard

[11] Patent Number: 4,611,761
[45] Date of Patent: Sep. 16, 1986

[54] FLEXIBLE SPRAY WAND

[76] Inventor: Stephen L. Pollard, 27703 Ortega Hwy. #14, San Juan Capistrano, Calif. 92675

[21] Appl. No.: 726,174

[22] Filed: Apr. 23, 1985

Related U.S. Application Data

[63] Continuation-in-part of Ser. No. 543,280, Oct. 19, 1983, abandoned.

[51] Int. Cl.[4] .......................... B05B 1/10; B05B 3/00
[52] U.S. Cl. .............................. 239/284 R; 239/229; 239/515
[58] Field of Search ............ 239/284, 289 A, 289 R, 239/289.1, 229, 513–515, 524; 134/172

[56] References Cited

U.S. PATENT DOCUMENTS

| 1,543,009 | 6/1925 | Hedgos | 239/513 X |
| 2,154,731 | 4/1939 | Crouley | 239/513 X |
| 2,601,655 | 6/1952 | Young | 239/229 |
| 2,704,084 | 3/1955 | James et al. | 239/513 X |
| 3,135,004 | 9/1962 | Naigraw | 350/582 X |
| 3,656,691 | 4/1972 | Norstrand | 239/284 A |
| 4,026,473 | 5/1977 | Tinder et al. | 239/284 A |
| 4,044,953 | 8/1977 | Vogel | 239/284 A X |
| 4,248,383 | 2/1981 | Savage et al. | 239/284 A |
| 4,505,001 | 3/1985 | Fasolino | 239/229 X |

FOREIGN PATENT DOCUMENTS

| 2502389 | 7/1976 | Fed. Rep. of Germany | 239/284.2 |
| 2818272 | 11/1979 | Fed. Rep. of Germany | 239/284.1 |

Primary Examiner—Joseph F. Peters, Jr.
Assistant Examiner—Kevin Patrick Weldon
Attorney, Agent, or Firm—Joseph E. Mueth

[57] ABSTRACT

A spray wand for cleaning the viewing surface of a rearview mirror on a vehicle. The wand is constructed of a flexible material enabling it to bend under pressure in an accurate manner to cause air and/or fluid dispensed from the wand nozzle to sweep the mirror surface. The rearview mirror is positioned in order to deflect a substantial part of the spray onto the side glass of the vehicle. Thus, both the surface of the rearview mirror and the side glass of the vehicle are cleaned by the spray wand.

5 Claims, 9 Drawing Figures

FLEXIBLE SPRAY WAND

This application is a continuation-in-part of application Ser. No. 543,280, filed 10/19/83 and abandoned on 4/23/85.

BACKGROUND OF THE INVENTION

Applicant is aware of Godfrey U.S. Pat. No. 3,455,624 which discloses a vehicle mirror cleaning device employing spray jets to remove and clean obstructions from the mirror. Naigraw U.S. Pat. No. 3,135,004 discloses a rear view mirror cleaning system utilizing spray nozzles connected to cleaning fluid containers located behind the mirror. In Lapraire U.S. Pat. No. 3,612,647 and Prince U.S. Pat. No. 3,855,661, there are described rear view mirror cleaning arrangements which both spray and wipe debris off of the surface of the mirror. Bergkvist U.S. Pat. No. 4,177,928 relates to a device for cleaning windshields, headlamp lenses, rear mirrors and other similiar surfaces of a vehicle.

The problem with the prior art is that generally there is no satisfactory way of sweeping the surface to be cleaned with pressurized cleaning fluid or pressurized air alone. The present invention is an improvement in the art by virtue of its ability to sweep the viewing surface clean and accomplishing this result by means which are simple and failure proof. It is believed that the present invention is a worthwhile advance in the art which is expected to be widely adopted.

SUMMARY OF THE INVENTION

Briefly, the present invention comprises:
a surface to be cleaned,
a source of pressurized air and/or cleaning fluid,
a dispensing means positioned in proximity to said surface,
means for conveying a stream of pressurized air and/or cleaning fluid from said source to said dispensing means,
the improvement wherein the dispensing means comprises a flexible wand means for sweeping said surface with pressurized air and/or cleaning fluid.

It is an object of this invention to provide a novel means for cleaning a surface.

More particularly, it is an object of this invention to provide a means for sweeping a surface to be cleaned with pressurized cleaning fluid and/or air.

More specifically, it is an object of my invention to provide a means for cleaning the viewing surface of a rear view mirror and other similar vehicular surfaces using a flexible wand which is adapted to bend under pressure in an arcuate manner to cause the air and/or fluid dispensed to sweep the surface.

These and other objects and advantages of my invention will appear from the more detailed description which follows, taken with the accompanying drawings.

DESCRIPTION OF THE PREFERRED EMBODIMENTS

Turning to the drawings.

Figure 1:
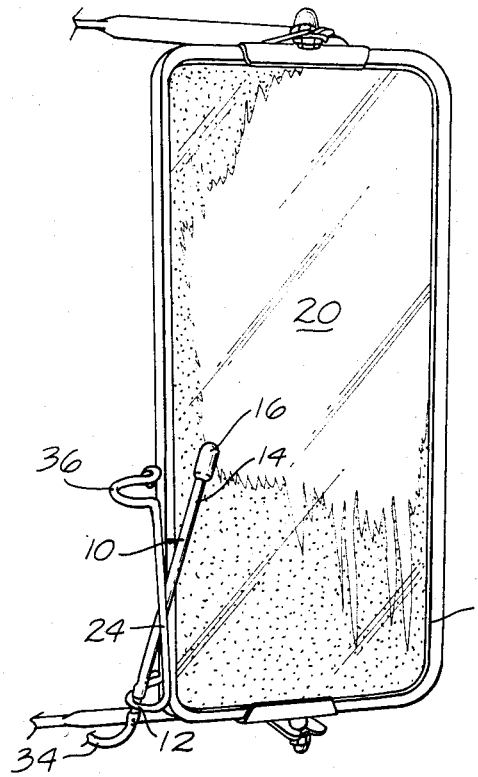
FIG. 1 is a perspective view of my preferred embodiment with the cleaning device forming part of a typical over-the-road truck rear view mirror.
Figure 2:
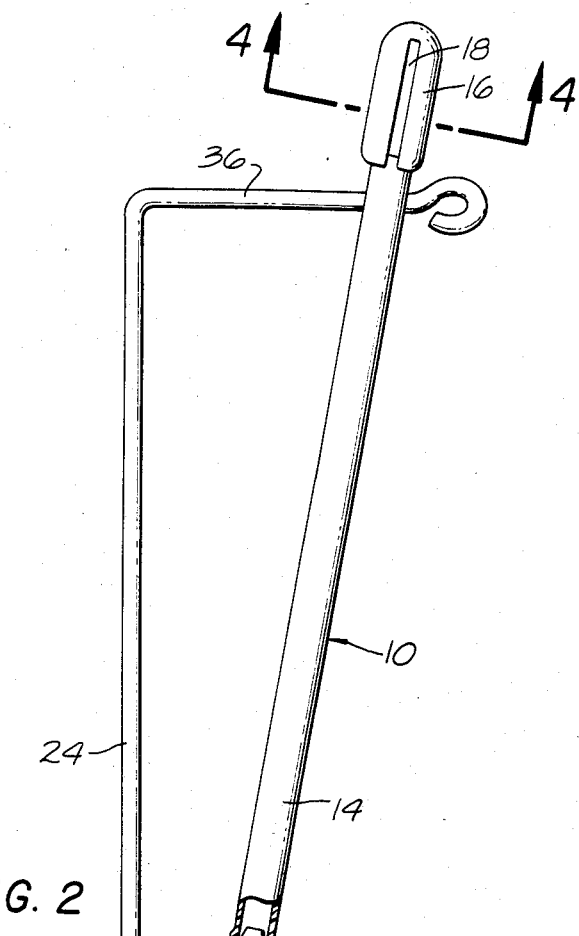
FIG. 2 is an enlarged view of the washing device, the viewer is in the position of the rear view mirror surface which is not shown.
Figure 5:
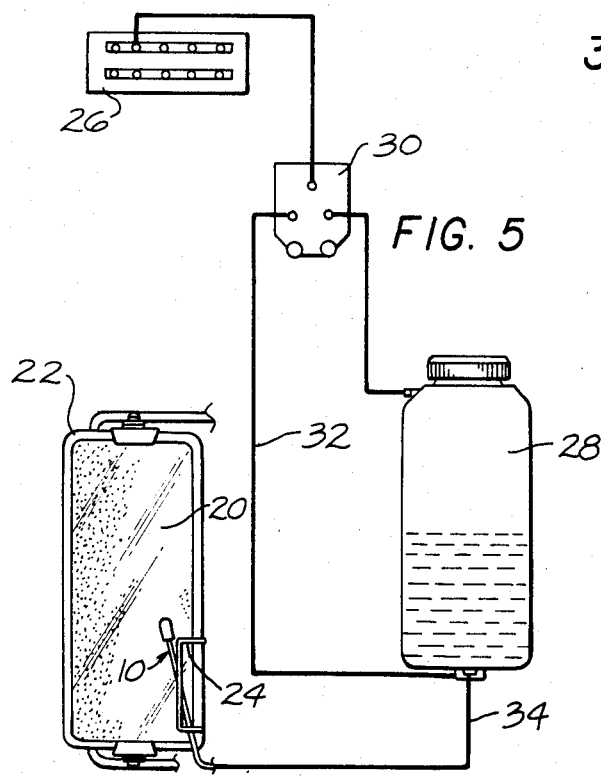
FIG. 5 is a schematic diagram of the system as a whole showing the pressurized air and fluid lines and the fluid source.
Figure 3:
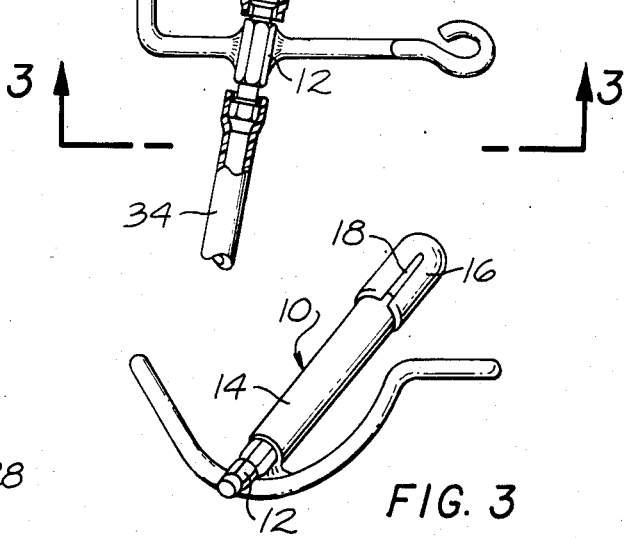
FIG. 3 is a section take along line 3—3 in FIG. 2.
Figure 4:
FIG. 4 is a section taken along line 4—4 in FIG. 2.
Figure 6:
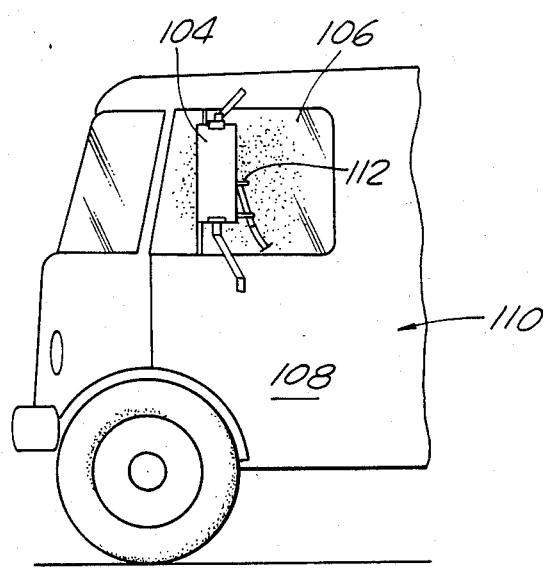
FIG. 6 shows a side view of a "cab-over-engine" truck equipped with the preferred embodiment of my invention.

Considering the drawing in detail, there is shown one embodiment of my invention which is preferred.

The wand 10 is affixed at point 12. The element 14 is a flexible plastic and the end cap 16 has one orifice 18 therein which faces the viewing surface 20 of the rear viewing mirror 22. The wand may have more than one orifice 18, if desired to enlarge the field of sweep. The element 14 is adapted to bend backwardly, that is away from the viewing surface 20 when it is internally pressurized. This bending causes the air and/or fluid to be discharged from longitudinal slit orifice 18 with an upward sweep onto viewing surace 20. In other words, at the instant of pressurization the discharge flow is straight ahead onto viewing surface 20. As the pressure within the wand is maintained, its free end bends back and away from view surface 20 so that the orifice now discharges "up-the-face" of the viewing surface 20. By turning the pressure on and off, a series of fluid sweep can be accomplished. If desired, air sweeps alone can be used or can follow a fluid sweep. The fluid sweep is always borne by pressurized air. However, pressurized air alone is useful to dry the viewing surface 10.

The wand 20 can be held by mount 24. However, the wand can also be made an integral part of a rear view mirror.

The cleaining fluid can be water or any conventional washing solution.

The invention is particularly applicable to rear view mirrors of the type used on over-the-road trucks. However, it is of general applicability to surface on vehicles which need cleaning while the vehicle is in operation.

The air valve block 26 is supplied by a source of high pressure air which exists on over-the-road trucks.

The fluid container 28 is associated with valve mechanism 30 which enables part of the air pressure to force fluid out of the container 28 and the balance of the air pressure is by-passed through line 32. The valve mechanism 30 is located inside the vehicle and in a location where it can be turned on and off by the vehicle operator.

The line 34 transmits fluid under air pressure or air pressure alone to wand 10.

The basic fluid and air systems used herein are already known. The improvement resides in the flexible wand which is held at one end and is adapted to dispense fluid and/or air at or around its free end to sweep the viewing surface and to more effectively clean and dry that surface.

The flexible wand can be of a metallic media that has a primary memory. If the basic material of composition lacks memory, then a spring or other material can be applied to provide memory.

In the embodiment shown in the drawing, the movement of the flexible wand 10 is limited by the semi-circular portion 36 of mount 22. Portion 36 limits the backward movement of the free end of the wand so that as the wand comes back, it hits the portion 36 and then slides along the inside of portion 36 so that movement of the wand is in two dimensions, backward and to the side.

The most preferred embodiment is applicable to "cab-over-engine" trucks. The side windows of the cab on such trucks, as well as the rearview mirrors, are subject to splash thrown up by the front wheels.

Figure 8:
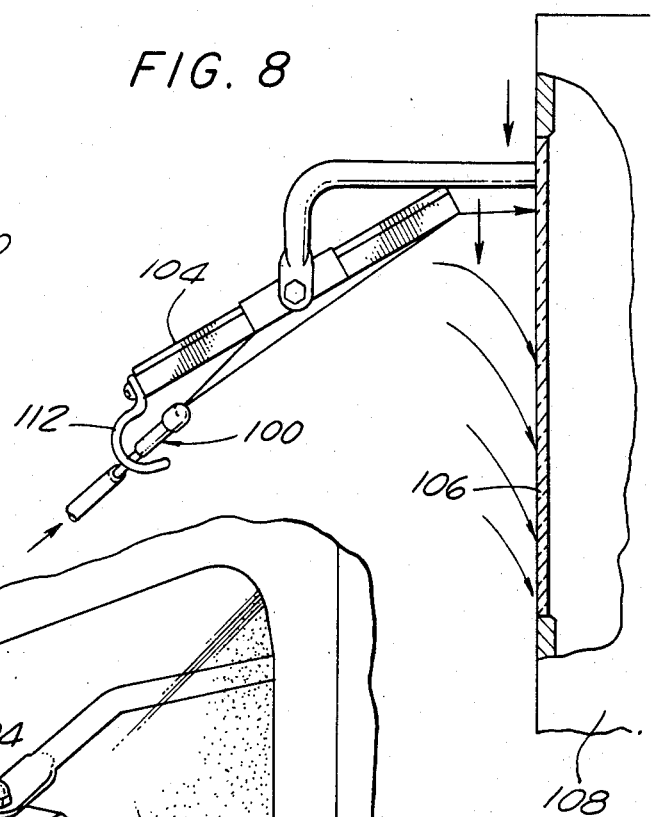
FIG. 8 is a top view of the embodiment of FIG. 6.
Figure 7:
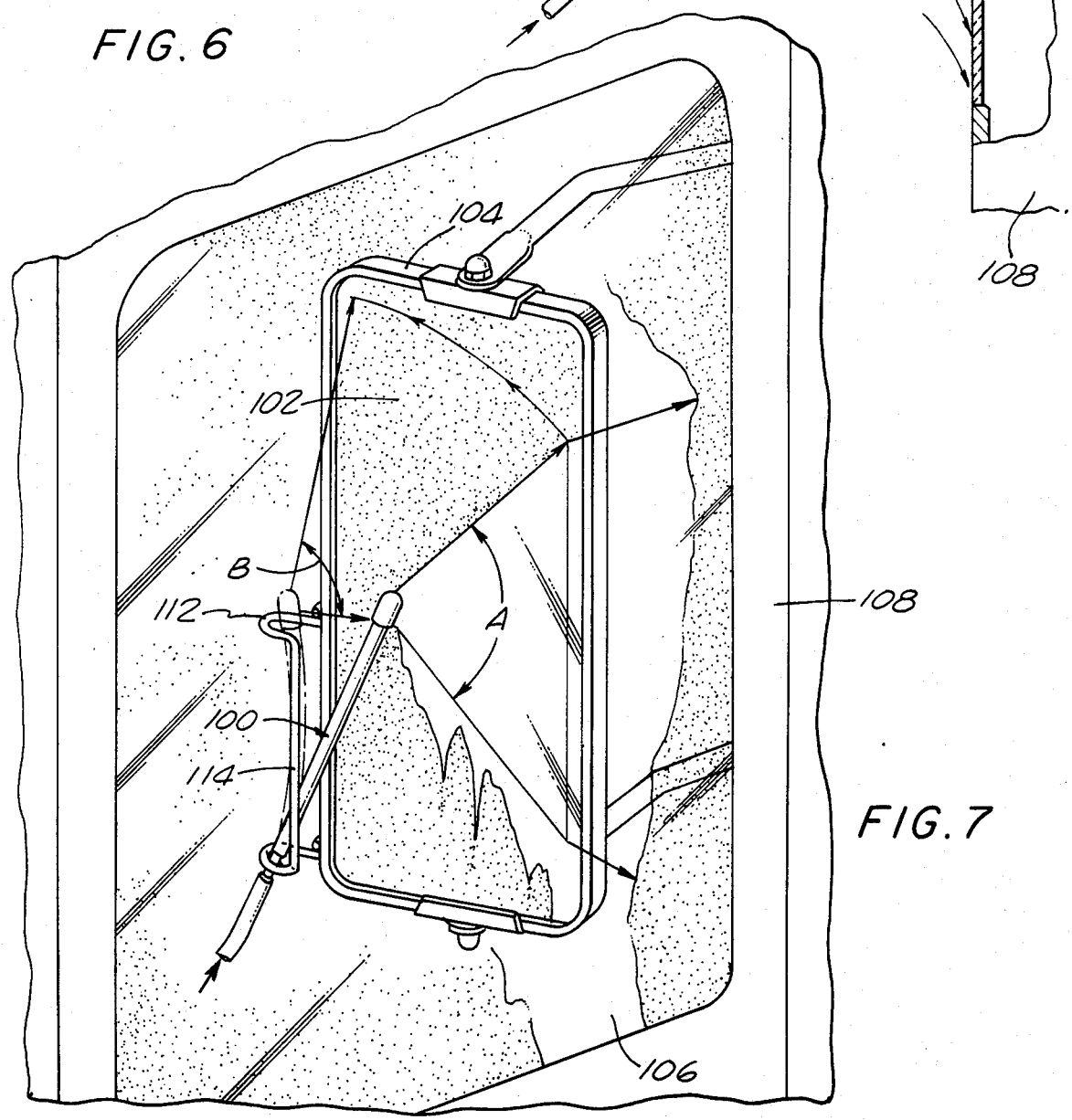
FIG. 7 is an enlarged view taken from the driver's seat within the truck cab in FIG. 6 showing the flexible wand in the initial position and in its terminal position when pressurized.
Figure 9:
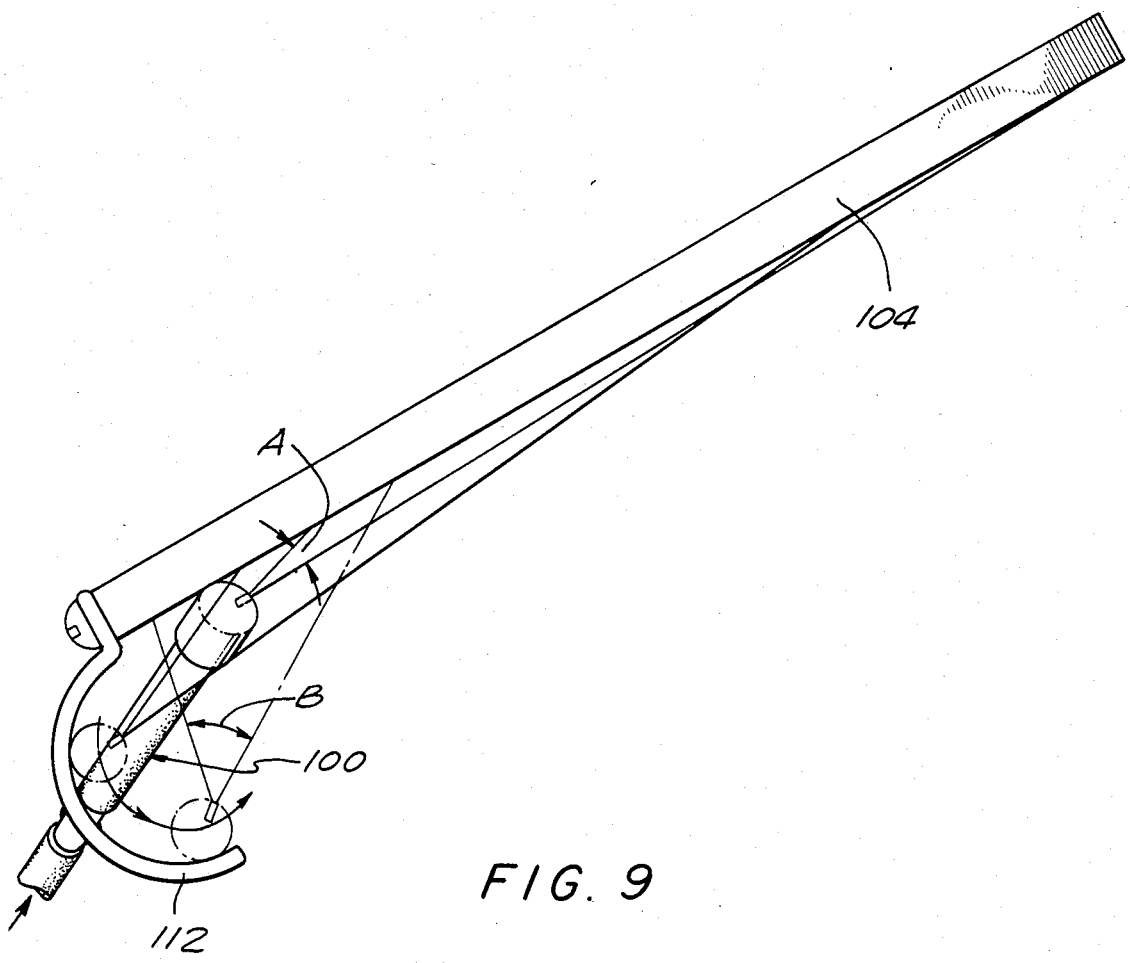
FIG. 9 is an enlarged top view of the embodiment of FIG. 6 showing the initial, intermediate and terminal position of the wand when it is pressurized.

As shown in FIG. 9, the flexible wand 100 is initially in contact with the glass surface 102 of rearview mirror 104. When the system is pressurized the fluid in wand 100 is discharged in the pattern A shown in FIG. 7. In a fraction of a second, the wand moves to the intermediate position shown in FIG. 9 and then to the terminal position shown in FIGS. 7, 8 and 9. The fluid discharge pattern in the terminal position is shown as B in FIG. 7.

Due to the angle of incidence of the fluid on the surface of the rearview mirror the fluid, first cleaning solution or water under pressure, and then pressurized air alone, the fluid first strikes the surface of the rearview mirror and then is deflected in substantial part onto the side glass 106 on the cab 108 of the truck 110. Thus, both the surface of the rearview mirror and the side glass of the cab of the truck are cleaned by the operation of this invention. This is an important feature since both surfaces must be cleared to permit effective use of the rearview mirror for rear viewing in a cab over engine truck.

The semi-circular portion 112 of mount 114 causes the wand 100 to allow an arcuate path as is clearly shown in FIG. 9. The movement of the wand through this arcuate path enables the cleaning of a larger field on the rearview mirror and side glass than would be possible with a fixed or rigid wand.

Having fully described the invention it is intended that it be limied only by the lawful scope of the appended claims.

I claim:

1. In a vehicle having a rearview mirror and side glass in proximity to the driver's seat, the improvement comprising cleaning means for cleaning the viewing surface of said rearview mirror and side glass comprising:
   a source of air pressure,
   a source of cleaning fluid,
   a dispensing means positioned in proximity to said viewing surface,
   means for conveying a stream of pressurized air and cleaning fluid from said sources to said dispensing means,
   wherein said dispensing means comprises a flexible wand affixed at one end and having at least one orifice therein at approximately its free end, said wand being adapted when internally pressurized to bend in an arc about its fixed end whereby fluid is dispensing onto said viewing surface in an upward sweep causing the fluid to strike a larger area of said viewing surface, said wand being so disposed with respect to said viewing surface of said rearview mirror and said side glass that the fluid, when dispensed, first strikes the viewing surface of the rearview mirror and then is deflected in substantial part onto said side glass.

2. The device of claim 1 wherein there is provided a means for limiting the extent of bending of the free end of said wand.

3. The device of claim 1 wherein said orifice is a longitudinal slit.

4. The device of claim 1 wherein said vehicle is a cab-over-engine truck.

5. The device of claim 1 wherein said wand follows an arcuate path when pressurized with said fluid.

* * * * *